INVENTOR.
GEORGE J. HANGGI
BY Jerry J. Dunlap
ATTORNEY

_United States Patent Office_ 2,921,477
Patented Jan. 19, 1960

2,921,477

CONSTANT FORCE VARIABLE SPEED VIBRATOR

George J. Hanggi, Ponca City, Okla., assignor to Continental Oil Company, Ponca City, Okla., a corporation of Delaware Application December 31, 1956, Serial No. 631,630

5 Claims. (Cl. 74—87)

This invention relates to improvements in vibrating apparatus, and more particularly, but not by way of limitation, to an improved apparatus for producing a substantially constant vibrating force at variable frequencies.

In the art of seismic surveying, seismic waves are generated in the earth at one point and detected at one or more points after being reflected and/or refracted by subsurface anomalies. The time-honored method of generating seismic waves is by the use of dynamite, which is ordinarily exploded in shallow bore or shot holes; however a rather recently developed method of seismic surveying (see U.S. Patent No. 2,688,124 issued to Doty and Crawford on August 31, 1954) utilizes a cyclically varying vibrator for generating seismic waves at the surface of the earth. For a practical operation, such a vibrator must generate seismic waves through a relatively wide range of frequencies; and it is preferred that the force generated by the vibrator be substantially constant throughout the frequency range.

At the present time the most popular vibrator for producing variable frequency vibrations is of the mechanical type which utilizes two eccentrics arranged opposite hand and rotating in opposite directions at equal speeds, whereby the forces generated by the eccentrics are subtractive in a horizontal direction and additive in a vertical direction to provide a substantially vertically imposed vibrating force to the earth's surface. With such a mechanical vibrator, the frequency of vibration may be easily controlled by controlling the frequency of gyration of the eccentrics; however, when it is desired that the vibrating force be maintained substantially constant at various frequencies, the weights of the eccentrics must be decreased at the higher frequencies and increased at the lower frequencies. It will be apparent that changing the weight of the eccentrics necessarily involves shutting down the vibrator for changing the weights a substantial number of times when generating vibrations through a substantial frequency range.

Various types of adjusting mechanisms have been proposed for changing the radius of gyration of eccentrics during operation of a vibrator to provide substantially constant vibrating forces at variable frequencies. Such adjusting mechanisms usually involve either a mechanical control which requires a shutdown of the vibrator to change the radius of gyration or the use of springs counteracting the centrifugal forces imposed on the eccentrics. To the best of my knowledge, no satisfactory control has been devised, heretofore, for adjusting the radius of gyration of eccentrics, particularly during operation of a vibrator.

The present invention contemplates a novel constant force variable speed vibrator utilizing adjustable eccentric weights wherein the radius of gyration of the weights is adjusted by a hydraulic control mechanism automatically during operation of the vibrator. Broadly stated, the present vibrator may be defined as: A frame, a pair of shafts rotatably secured on the frame in parallel relation, means for rotating the shafts in opposite directions at equal, but variable, speeds, a force-producing weight adjustably carried by each shaft, said weights being arranged in opposite-hand relation, and hydraulic means carried by each shaft and connected to the respective weight, said hydraulic means being responsive to centrifugal force for adjusting the position of the weights in accordance with the speed of rotation of said shafts.

An important object of this invention is to provide an apparatus which will produce substantially constant vibrations through a wide range of frequencies.

Another object of this invention is to provide an apparatus which will accomplish the foregoing object automatically.

A further object of this invention is to provide a constant force variable speed vibrator using movable eccentric weights wherein the radii of gyration of the weights are adjusted by hydraulic means in accordance with the frequency of vibration.

Another object of this invention is to provide a vibrator using the centrifugal force generated by a rotating liquid body for adjusting the radii of gyration of eccentric weights used in the vibrator.

A still further object of this invention is to provide a simply constructed constant force variable speed vibrator which may be economically manufactured.

Other objects and advantages of the invention will be evident from the following detailed description, when read in conjunction with the accompanying drawings, which illustrate my invention.

Figure 1:
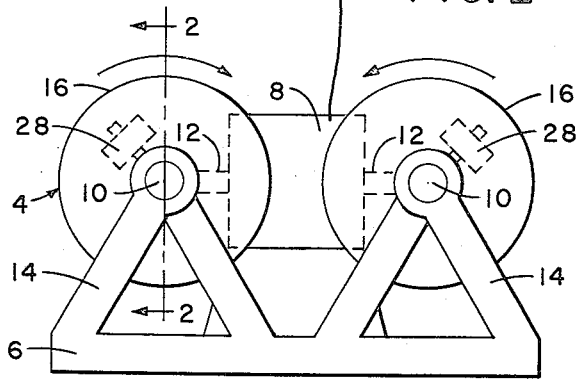
Figure 1 is an end elevational view of a vibration apparatus constructed in accordance with this invention, with a portion of the apparatus being shown schematically.

Referring to the drawings in detail, and particularly Figure 1, reference character 4 generally designates a vibrator constructed in accordance with this invention. The vibrator 4 comprises a suitable frame 6 supporting a prime mover 8, such as an internal combustion engine or electric motor, which is used to rotate two parallel shafts 10 in opposite directions. Suitable gearing and drive systems are schematically shown at 12 to provide connection of the prime mover 8 to the shafts 10. Each shaft 10 is journaled and supported on the frame 6 at spaced points along its length by suitable braces 14, whereby forces imposed on the shafts 10 will be effectively transmitted to the common frame 6.

Figure 2:
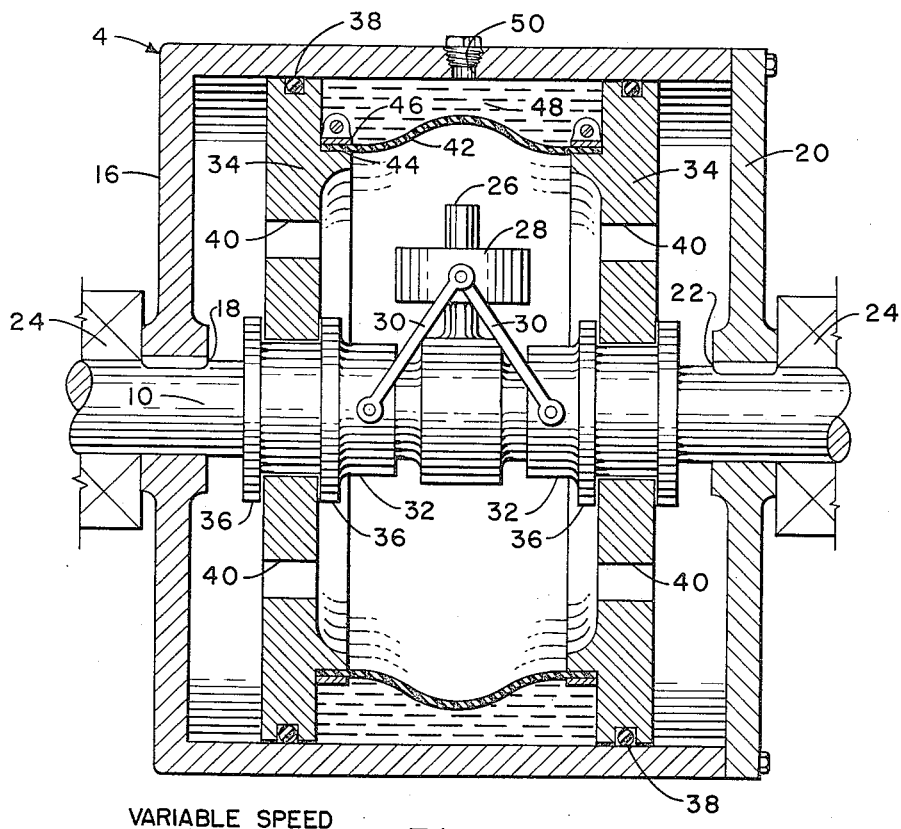
Figure 2 is a sectional view taken along lines 2—2 of Figure 1.

As shown most clearly in Figure 2, a housing 16 is telescoped over each of the shafts 10, and each housing 16 is secured to its respective shaft by a complementary key and keyway 18, whereby the housings 16 will be rotated with the shafts 10. The open end of the housing 16 is closed by a cap member 20 which has a central aperture therethrough for receiving the shaft 10. The cap 20 is suitably bolted to the respective housing 16 and is secured to the respective shaft 10 by a complementary key and keyway 22. Thus, each housing 16 is effectively secured to the respective shaft 10 at the opposite ends of the housing, whereby the housings will be rotated simultaneously with the shafts 10. It will also be noted that the opposite ends of each housing 16 abut bearings 24, which bearings are secured in the spaced braces 14, whereby the housings 16 will be retained in their desired longitudinal positions on the shafts 10.

Each shaft 10 has a stud 26 extending radially outward therefrom at about the center of the respective housing 16. Each stud 26 slidingly receives a weight or eccentric 28. The weights 28 are utilized to provide vibrational forces on the shafts 10, and in turn the common frame 6, upon rotation of the shafts 10 as will be more fully hereinafter set forth. Also, as indicated in Figure 1, the studs 26 and weights 28 are positioned opposite hand on the two shafts 10.

Referring again to Figure 2, each weight 28 has four arms 30 (only two of which are shown) pivotally secured thereto. The arms 30 extend toward the respective shaft 10 and are pinned at their opposite ends to guide sleeves 32. Two of the guide sleeves 32 are slidingly secured on each shaft 10 within each housing 16 on opposite sides of the radial stud 26. It will be apparent that when each pair of guide sleeves 32 are moved along the respective shaft 10 outwardly from one another, the arms 30 will tend to pull the respective weight 28 along the respective stud 26 toward the shaft 10. Conversely, movement of each pair of sleeves 32 toward one another forces the respective weight 28 outwardly along the stud 28 from the shaft 10.

A piston 34 is telescoped over each guide sleeve 32 and is preferably secured on the respective guided sleeve by circumferential shoulders 36 projecting outwardly from the guide sleeve 32. The guide sleeves 32 may be constructed in sections (not shown) to facilitate assembly of the pistons 34 thereon as will be apparent to those skilled in the art. Each piston 34 is preferably in the form of a flat plate and extends outwardly from the respective shaft 10 into proximity with the inner periphery of the respective housing 16. A suitable sealing ring 38 is secured in the outer periphery of each piston 34 to sealingly engage the inner periphery of the respective housing 16 for purposes which will be hereinafter set forth. Also, each piston 34 may be provided with a series of apertures 40 therethrough, if desired, to provide a reduced weight for the pistons 34.

A tubular-shaped flexible diaphragm 42 is secured to the adjacent faces of each pair of pistons 34 within the respective housing 16. The opposite ends of each diaphragm 42 may be secured on outwardly facing shoulders 44 formed on the adjacent faces of the pistons 34 by means of circular bands or clips 46. It is necessary, however, that the opposite ends of each diaphragm 42 are tightly secured to the respective pistons 34 to prevent leakage of liquid around the diaphragm. It will thus be apparent that each diaphragm 42 provides an annular chamber 48 with the inner periphery of the respective housing 16 and the respective pistons 34. A suitable liquid, such as oil, is disposed in each of the annular chambers 48 and may be injected into the chambers 48 through suitable plugged fill apertures 50 formed in the outer wall of the respective housings 16.

In operation, the prime mover 8 drives the shafts 10 in opposite directions as indicated by the arrows in Figure 1. Also, the shafts 10 are rotated at equal speeds to properly position the force-producing weights 28, whereby the forces produced by the weights 28 will be added when the weights are moving generally upward or downward and will be subtracted when the weights are moving substantially horizontally. Thus, the vibrator 4 will vibrate in substantially a vertical direction, and horizontal movement of the vibrator will be reduced to a minimum. The frequency of vibration is varied by varying the speeds of rotation of the shafts 10.

As each shaft 10 and its respective weight 28 are rotated, the respective housing 16, pistons 34, and guide sleeves 32 are rotated simultaneously in a similar direction. As a result, the oil or other liquid in the chamber 48 is similarly rotated to generate a centrifugal force and increase the pressure of the liquid. This increased pressure is transmitted to the pistons 34, tending to force the pistons outwardly away from one another. The flexible diaphragm 42 is of a size to provide a minimum resistance to this outward movement.

The parting movement of the pistons 34 is transmitted to the guide sleeves 32 to in turn move the arms 30 and force the eccentric 28 inwardly on the stud 26 toward the respective shaft 10. Conversely, the centrifugal force generated by rotating the weight 28 tends to force the arms 30, sleeves 32, and pistons 34 in the opposite directions. Thus, the forces generated in the rotating liquid in the chamber 48 and the rotating weight 28 tend to balance out at a given speed of rotation of the shafts 10 to position the weights 28 a specific distance from the respective shafts 10 at specific speeds of rotation. As the speed of rotation of each shaft 10 is increased, the centrifugal force generated by the respective quantity of oil in the respective chamber 48 increases to move the pistons 34 farther apart. This movement is continued to move the respective weight 28 inwardly toward the shaft 10 until a new condition of balance is reached.

The centrifugal force generated by each weight 28 and shaft 10 may be determined by the following formula:

$$CF = W\pi^2 N^2 r / 900g$$

wherein W equals the weight of the eccentric 28; N equals the revolutions per minute of the shaft 10; $r$ equals the distance between the center of gravity of the weight 28 and the center of the shaft 10, or the radius of gyration of the weight; and $g$ equals acceleration due to gravity.

In applying this equation to each shaft assembly, W, the weight of the eccentric 28 will remain constant, but N, the r.p.m., and $r$, the radius of gyration of the weight 28, will vary, with the radius of gyration of the weight 28 varying inversely as the square of the revolutions. It will be apparent to those skilled in the art that the various components of each shaft assembly may be designed to effectively follow this relationship. When two of the shaft assemblies are in synchronism as previously described, the vibrator 4 will generate a resultant vibrating force which is substantially constant throughout an extended frequency range.

From the foregoing it will be apparent that the present invention provides an apparatus which effectively accomplishes the objects set forth in the forepart of this specification.

Changes may be made in the combination and arrangement of parts, as well as in the various details described and shown, without departing from the spirit and scope of the invention as set forth in the following claims.

I claim:

1. In a constant force variable speed vibrator, a pair of drive shafts, drive means connected to the shafts for rotating the shafts at variable but equal speeds in opposite directions, a force producing weight carried by each shaft for rotation with the shaft, movable linkage carried by each shaft for adjusting the distance between the weights and the shafts and hydraulic means including a hydraulic cylinder carried by each shaft for rotation with the shaft at least one portion of said cylinder being movable in response to centrifugal force imposed on liquid in the cylinder and connected to said linkage for adjusting the position of said weight in accordance with the speed of rotation of said shaft.

2. In a constant force variable speed vibrator, a pair of drive shafts, drive means connected to the shafts for rotating the shafts at variable but equal speeds in opposite directions, a force producing weight carried by each shaft for rotation with the shaft, movable linkage carried by each shaft for adjusting the distance between the weights and the shafts and hydraulic means including an annular hydraulic cylinder surrounding each shaft and carried by the shaft for rotation with the shaft, at least one wall of said cylinder being movable in response to the centrifugal force of liquid in said cylinder and connected to said linkage for adjusting the position of said weight in accordance with the speed of rotation of said shaft.

3. A constant force, variable speed vibrator, comprising a frame, a pair of shafts rotatably supported on the frame in parallel relation, drive means connected to the shafts for rotating the shafts at variable, but equal, speeds in opposite directions, a hollow housing secured around each shaft for rotation with the respective shaft, a pair of pistons slidably secured on each shaft within the respective housing, each of said pistons being of a size to sealingly engage the inner periphery of the respective housing, a flexible diaphragm interconnecting each pair of pistons to provide an annular cylinder with the respective pistons and the respective housing, a supply of liquid in each cylinder for moving the respective pistons through centrifugal force generated by the liquid upon changes in the speed of rotation of the shafts, a force producing weight carried by each shaft for rotation with the shaft, said weights being arranged in opposite hand relation and linkage connecting each weight with at least one of the respective pistons for adjusting the radial distance between each weight and its respective shaft in accordance with the speed of rotation of said shafts.

4. Apparatus as defined in claim 3 characterized further in that each shaft has a radially extending stud thereon in the respective housing, and each weight is slidingly secured on the respective stud for movement radially with respect to the respective shaft.

5. Apparatus as defined in claim 4 characterized further in that each shaft has a pair of guide sleeves slidingly secured thereon on opposite sides of the respective stud, said pistons are secured on said guide sleeves, and an arm is pivotally secured between each guide sleeve and the respective weight, whereby relative outward movement of said guide sleeves moves the weights toward the respective shafts and centrifugal force generated by each weight tends to move the respective guide sleeves toward one another.

References Cited in the file of this patent

UNITED STATES PATENTS

| | | |
|---|---|---|
| 2,464,394 | Herzlinger | Mar. 15, 1949 |
| 2,703,490 | Brueggeman et al. | Mar. 8, 1955 |

FOREIGN PATENTS

| | | |
|---|---|---|
| 769,547 | Great Britain | Mar. 6, 1957 |